United States Patent [19]
Colvin et al.

[11] Patent Number: 5,290,904
[45] Date of Patent: Mar. 1, 1994

[54] HEAT SHIELD

[75] Inventors: David P. Colvin, Apex; Yvonne G. Bryant; James C. Mulligan, both of Raleigh, all of N.C.

[73] Assignee: Triangle Research and Development Corporation, Raleigh, N.C.

[21] Appl. No.: 738,848

[22] Filed: Jul. 31, 1991

[51] Int. Cl.$^5$ ............................. B32B 3/02; C09K 5/00
[52] U.S. Cl. ............................. 428/68; 126/400; 165/10; 165/53; 428/72; 428/76; 428/192; 428/194; 428/220; 428/320.2; 428/321.5; 428/323; 428/458; 428/626; 428/913; 428/920; 428/921
[58] Field of Search ............... 428/68, 76, 72, 458, 428/913, 920, 921, 220, 320.2, 321.5, 323, 194, 192, 626; 224/907; 228/59; 126/400; 165/53, 10; 52/173 R

[56] References Cited

U.S. PATENT DOCUMENTS

| | | | |
|---|---|---|---|
| 1,586,546 | 1/1926 | Wyeth | 126/207 |
| 2,641,068 | 6/1953 | Thompson | 36/44 |
| 4,003,426 | 1/1977 | Best | 165/53 |
| 4,038,447 | 7/1977 | Brock | 428/76 |
| 4,055,699 | 10/1977 | Hsiung | 428/311 |
| 4,111,189 | 9/1978 | Dizon | 126/400 |
| 4,249,319 | 2/1981 | Yoshida | 36/2.6 |
| 4,304,824 | 12/1981 | Karpinski | 428/76 |
| 4,331,731 | 5/1982 | Seike et al. | 36/44 |
| 4,513,053 | 4/1985 | Chen | 428/221 |
| 4,658,515 | 4/1987 | Oatman | 36/44 |
| 4,703,754 | 11/1987 | Ibbott | 128/383 |
| 4,797,160 | 1/1989 | Salyer | 428/921 |
| 5,108,821 | 4/1992 | Dooley | 428/76 |

*Primary Examiner*—Ellis P. Robinson
*Assistant Examiner*—Nasser Ahmad
*Attorney, Agent, or Firm*—Robert G. Rosenthal

[57] ABSTRACT

A thermal shield comprising first and second substantially flat flame resistant covering layers adapted to overlie each other. A thermal energy absorbing material is positioned between the respective layers in sandwich fashion. The thermal energy absorbing material may comprise a phase change material in bulk, micro or macro encapsulated and which may further be embedded within a base material to provide enhanced thermal protection.

9 Claims, 2 Drawing Sheets

HEAT SHIELD

This invention was made with Government support under contract no. F33615-86-C-3430 awarded by the United States Air Force. The Government has certain rights in this invention.

FIELD OF THE INVENTION

This invention relates generally to the field of reflective heat shields and more particularly to heat shields useful for shielding objects from transient thermal pulses.

BACKGROUND OF THE INVENTION

It is known to provide a non-flammable or flame resistant barrier in order to protect persons or property from the detrimental effects of fire. Examples of such materials are NOMEX ® manufactured by DuPont and Polybenzimidazole (PBI) manufactured by Hoechst Celanese. These fibers and the fabrics made therefrom, while effective in protecting the user from flames for limited periods of time, are only marginally helpful in protecting the user from the effects of extreme heat.

It would, therefore, be of considerable commercial value to provide an improved heat shield.

It is, accordingly, an object of the present invention to provide a heat shield that is effective against flames.

Another object of the present invention is to provide a heat shield that effectively shields against heat and especially against transient thermal pulses.

SUMMARY OF THE INVENTION

These and other objects are accomplished by providing a heat shield for protecting an object from thermal energy. The heat shield comprises first and second substantially flat nonflammable covering layers that are adapted to overlie each other. A thermal energy absorbing material is positioned between the respective layers in sandwich fashion.

The thermal energy absorbing material may comprise a phase change material which may be macro or micro encapsulated and which may further be embedded within a base material.

BRIEF DESCRIPTION OF THE DRAWINGS

Some of the features and advantages of the invention having been briefly stated, others will appear from the detailed description which follows, when taken in connection with the accompanying drawings, in which—

DETAILED DESCRIPTION OF THE ILLUSTRATED EMBODIMENTS

While the present invention will be described more fully hereinafter, it is to be understood at the outset that persons of skill in the art may modify the invention herein described while still achieving the favorable results of the invention. Accordingly, the description which follows is to be understood as a broad teaching disclosure directed to persons of skill in the appropriate arts, and not as limiting upon the present invention.

Figure 1:
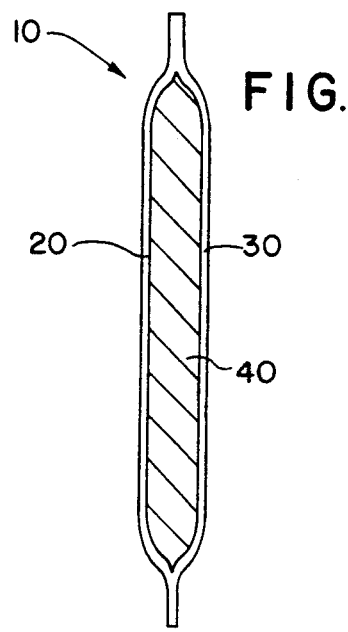
FIG. 1 is a side view of a first embodiment of the heat shield according to the present invention.
Figure 2:
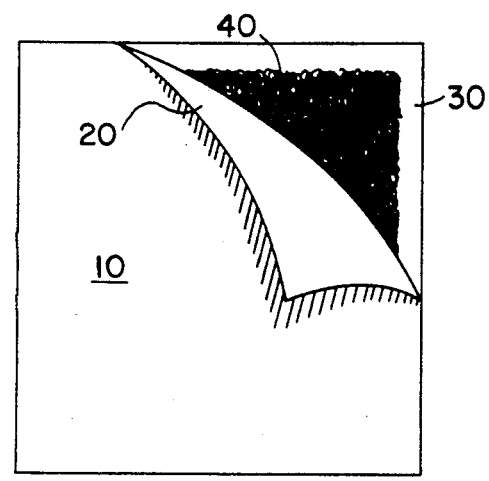
FIG. 2 is a plan view, partially broken away, of a first embodiment of the heat shield according to the present invention.
Figure 3:
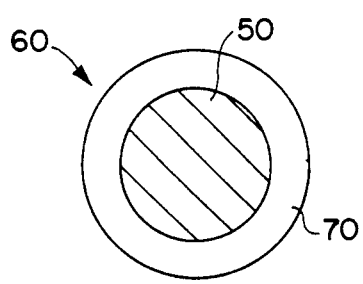
FIG. 3 is a cross-section of a microcapsule containing a phase change material within a surrounding shell as used in the present invention.

Referring more specifically to the drawings and particularly to FIGS. 1 and 2, a first embodiment of the heat shield generally indicated at 10 is there illustrated. The heat shield 10 comprises a first covering layer 20, a second covering layer 30 and a thermal energy absorbing means 40 positioned therebetween in sandwich fashion.

The respective first and second covering layers 20,30 normally comprise a nonflammable, flexible material such as aluminized MYLAR ® approximately 5 mils in thickness. In the embodiment of FIGS. 1 and 2, the first and second covering layers 20,30 are connected together about at least a portion of their periphery by suitable means such as an adhesive or fusion.

The heat shield also includes a thermal energy absorbing means 40 positioned between the first covering layer 20 and the second covering layer 30. The thermal energy absorbing means 40 may comprise a bulk-phase change material, or a phase change material embedded with a solidifiable base means such as a silicone rubber binder or equivalents thereof. In addition, the thermal energy absorbing means 40 may comprise a macro or micro encapsulated phase change material 50 used in bulk or in combination with the aforementioned solidifiable base means. As used herein, microcapsules 60 are approximately ten microns and under in diameter while macrocapsules are normally greater than ten microns in diameter. The type of phase change material used in a given application will vary with the anticipated temperature. For example, the melting point of a homologous series of paraffinic hydrocarbons is directly related to the number of carbon atoms a shown in the following table:

| Compound Name | Number of Carbon Atoms | Melting Point Degrees Centigrade |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Each of the above materials can be separately encapsulated and is most effective near the melting point indicated. It will be seen from the foregoing that the effective temperature range of the shield can, therefore, be tailored to a specific environment by selecting the phase change materials required for the corresponding temperature and adding microcapsules containing the material to the shield.

In addition, the shield can be designed to have enhanced thermal characteristics over a wide range of temperature or at discrete temperature ranges through proper selection of phase change material.

In fabricating the shield, the desired phase change material 40 is selected and is sandwiched between the first and second covering layers 20,30. Depending on the desired end use, the covering layers 20,30 may be sealed about all or a portion of their outer peripheral edge in order to contain the phase change material after it undergoes the latent energy transition or melt.

In an alternate embodiment, the phase change material may be encapsulated or not and is dispersed throughout the hardenable base material. The phase change material 40 containing base material may then be sandwiched between covering layers 20,30. In this manner, the unencapsulated phase change material 40 is substantially held in place by the base material. Similarly, the encapsulated phase change material is held in place by a dual wall, one being supplied by the capsule wall 70 and the second from the cavity formed in the base material to hold phase change material. Thus, leakage of molten phase change material (PCM) is minimized during its liquid phase, enhancing its life and repeatability of thermal response.

Figure 4:
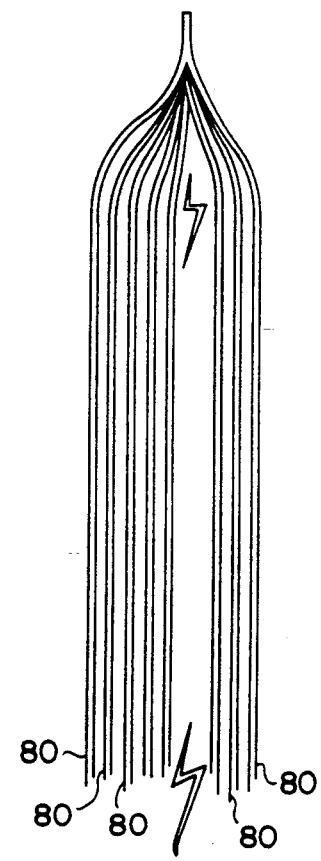
FIG. 4 is a side view of a second embodiment of the heat shield according to the present invention.

In another important aspect of the invention, additional covering layers and interspersed layers of thermal energy absorbing means can be added as per FIG. 4. This increases the time required for a thermal impulse to penetrate through the various layers, thus adding additional thermal protection to the shielded object.

Figure 5:
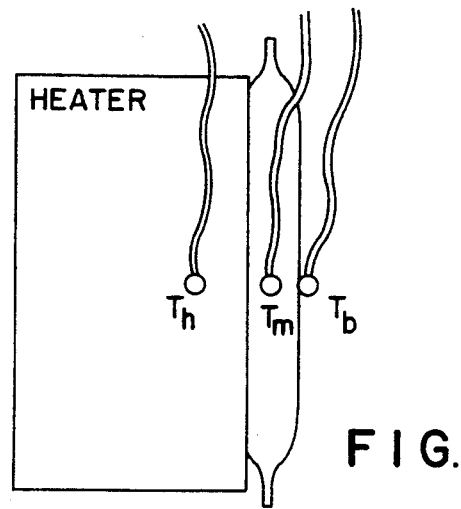
FIG. 5 illustrates the system used to measure the degree of thermal shielding provided by a variety of heat shields.
Figure 6:
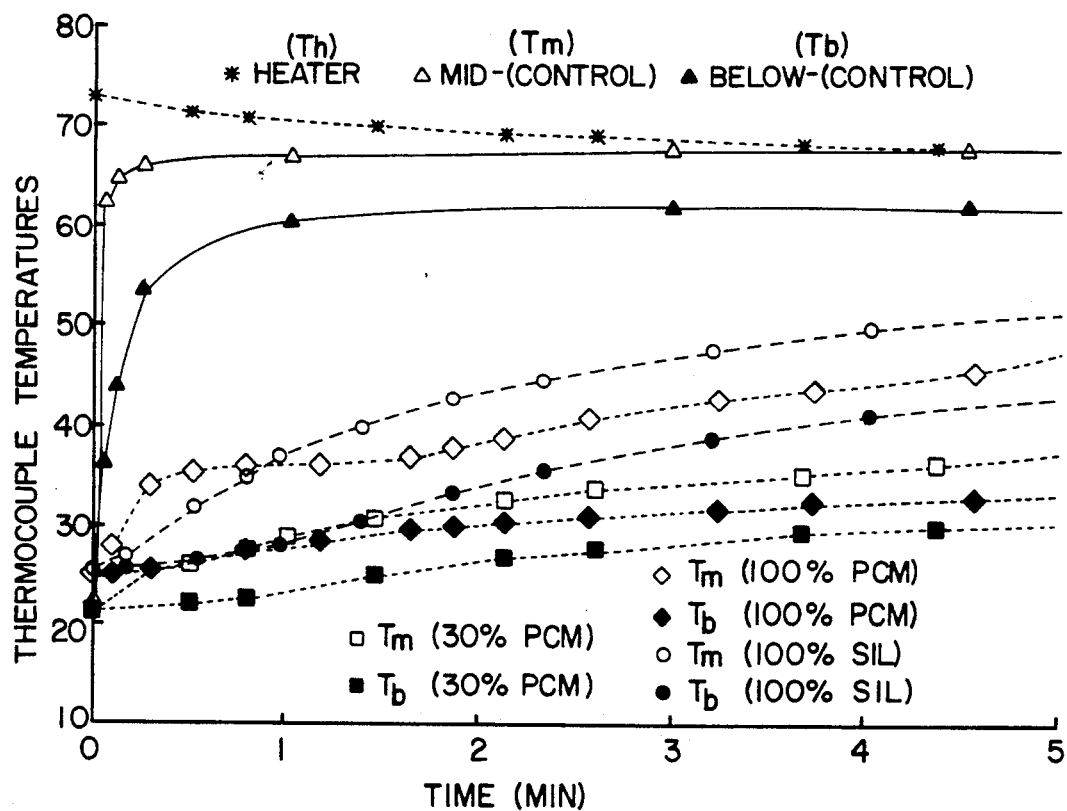
FIG. 6 illustrates the thermal shielding available from heat shields including a variety of thermal energy absorbing compositions employing eicosane phase change material.

Referring to FIG. 4, a series of tests were conducted using three 3.5"×4.5" samples made up of ten layers 80 of aluminized MYLAR ®. Thermocouples were placed inside the outermost surface of each foil shield sandwich and in the center of the ten layers in order to monitor the shield's temperature history as an instrumented hot metal block was contacted. The temperature of the heated block was controlled to a constant temperature of 69 degrees centigrade for each of the experiments and the contact pressure remained the same. One of the samples with no filler at all served as a control while other samples of identical size contained silicone rubber alone, microencapsulated eicosane PCMs in a silicone rubber binder, and still another contained 100 percent bulk eicosane material. The apparatus is shown in FIG. 5. The results of the tests are shown in FIG. 6. Temperature versus time is plotted for the contacting heater itself at position $T_m$, the temperature at the center of the 3.5"×4.5" samples at $T_m$, and the temperature behind the foil sandwich away from the metal block at $T_b$. The temperatures $T_m$ and $T_b$ of the control foil blanket were seen to rise almost instantly as the heat was applied. The temperature at $T_b$ of the control shield was less than 10 degrees centigrade below the temperature $T_m$ of the heater. The data for the bulk PCM was not reproducible because after the bulk 100 percent PCM had melted, it ran or flowed between the foil layers to such an extent that the shield would offer only localized protection. However, it can be seen that the foil sandwich filled with a silicone rubber binder and 30 percent PCM by weight provided a significant amount of thermal protection for an extended period of time. The temperature $T_m$ within the foil sandwich reached only 50 degrees centigrade after 20 minutes of heating and the temperature $T_b$ behind the thermal shield was below 40 degrees centigrade after 20 minutes; a temperature gradient across the foil sandwich of approximately 30 degrees centigrade. As seen in FIG. 6, the performance of the 30 percent microencapsulated PCM in silicone rubber was better than that for either the bulk 100 percent PCM or silicone rubber alone. Thus, it will be seen that such a flexible PCM filled shield or blanket could act as an improved, lightweight heat shield against transient thermal impulses.

The foregoing embodiments and examples are to be considered illustrative, rather than restrictive of the invention, and those modifications which come within the meaning and range of equivalence of the claims are to be included therein.

That which is claimed is:

1. A heat shield characterized by its ability to insulate from heat or cold and comprising:
   a first covering layer;
   a second covering layer overlying said first covering layer, said first covering layer and said second covering layer being flat and non-flammable;
   a base means positioned between said first covering layer and said second covering layer;
   a plurality of microcapsules integral with and dispersed throughout said base means and being held in place thereby, said microcapsules having a diameter of less than about 10 microns and containing paraffinic hydrocarbon as a thermal energy absorbing means and wherein said microcapsules are adapted to withstand repeated latent heat of fusion thermocycling;
   whereby the shield exhibits enhanced thermal shielding properties and repeatability of thermal response over extended time periods when subjected to thermal energy.

2. A heat shield according to claim 1 wherein said base means comprises a silicone rubber binder.

3. A heat shield according to claim 1 further including additional covering layers and additional layers of thermal energy absorbing means positioned between adjacent covering layers.

4. A heat shield according to claim 1 wherein said first covering layer and said second covering layer further include metal covering layer.

5. A heat shield characterized by its ability to insulate from heat or cold and comprising:
   a first flat non-flammable covering layer;
   a second flat non-flammable covering layer adapted to overlie said first covering layer; and
   a base means positioned between said first covering layer and said second covering layer;
   a plurality of microcapsules having a diameter of less than about 10 microns integral with and dispersed throughout said base means and being held in place thereby, said microcapsules being adapted to withstand repeated latent heat of fusion thermocycling and containing a paraffinic hydrocarbon selected from the group consisting of n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadeceane, n-Tetradecane, and n-Tridecane;
   whereby the shield exhibits enhanced thermal shielding properties and repeatability of performance over extended time periods when subjected to thermal energy.

6. A heat shield according to claim 5 wherein said first covering layer and said second covering layer are connected together about at least a portion of their outer peripheral edges thereby retaining said thermal energy absorbing mean between said respective first and second covering layers.

7. A heat shield according to claim 5 wherein said first and second flame resistant covering layers comprise a metal covered mylar.

8. A heat shield according to claim 7 wherein said metal comprises aluminum.

9. A heat shield according to claim 5 wherein said base means comprises a silicone rubber binder.

* * * * *